(12) United States Patent
Gauthier et al.

(10) Patent No.: US 8,499,560 B2
(45) Date of Patent: Aug. 6, 2013

(54) AUTONOMOUS PYROTECHNICAL METHOD AND DEVICE FOR INJECTING A FLUID

(75) Inventors: Corinne Gauthier, Fontenay le Vicomte (FR); Pierre Yvart, Vert-le-Petit (FR); Laurent Blarasin, Vulaines sur Seine (FR)

(73) Assignee: Herakles, Le Haillan (FR)

( * ) Notice: Subject to any disclaimer, the term of this patent is extended or adjusted under 35 U.S.C. 154(b) by 887 days.

(21) Appl. No.: 12/520,911

(22) PCT Filed: Jan. 8, 2008

(86) PCT No.: PCT/FR2008/050030
§ 371 (c)(1),
(2), (4) Date: Dec. 1, 2009

(87) PCT Pub. No.: WO2008/107579
PCT Pub. Date: Sep. 12, 2008

(65) Prior Publication Data
US 2010/0101442 A1      Apr. 29, 2010

(30) Foreign Application Priority Data
Jan. 10, 2007   (FR) ..................... 07 52609

(51) Int. Cl.
*F01B 29/08*      (2006.01)
(52) U.S. Cl.
USPC ............................................. 60/632; 60/633
(58) Field of Classification Search
USPC .................................................. 60/632, 633
See application file for complete search history.

(56) References Cited

U.S. PATENT DOCUMENTS

| | | | |
|---|---|---|---|
| 5,881,819 A | 3/1999 | Walters et al. | |
| 5,988,438 A * | 11/1999 | Lewis et al. | 222/3 |
| 6,942,261 B2 * | 9/2005 | Larsen et al. | 293/107 |

FOREIGN PATENT DOCUMENTS

| | | |
|---|---|---|
| EP | 0784998 | 7/1997 |
| JP | 8-266660 | 10/1996 |
| JP | 9-192252 | 7/1997 |

\* cited by examiner

*Primary Examiner* — Hoang Nguyen
(74) *Attorney, Agent, or Firm* — Hamre, Shumann, Mueller & Larson, P.C.

(57) ABSTRACT

The invention relates to a method and to an autonomous device (10*d*) for injecting a fluid (F), that uses pyrotechnical means (1*d*). The invention can be used in particular for injecting a protection fluid (F) into a system that is subject to overheating (8*d*). The method is characterized in that it uses a thermally triggered charge (1*d*).

11 Claims, 3 Drawing Sheets

AUTONOMOUS PYROTECHNICAL METHOD AND DEVICE FOR INJECTING A FLUID

The present invention relates to a method and to a device for the autonomous injection of a fluid involving pyrotechnic means. It relates more particularly to a method and to a device for the autonomous injection of a safeguarding, protective or conditional preventive-maintenance fluid in overheating situations.

In recent years, the use of thermal initiation has been extended to fields encompassing automotive safety and hazardous goods transportation safety as well as electrical safety and fire extinction. In the fields of automotive safety and hazardous goods transportation safety, thermal initiation is used to neutralize devices placed in accidental conditions before they explode or produce unexpected effects (FR 2 870 234 and U.S. Pat. No. 5,253,895). In the electrical safety field and the fire is extinction field, it is common practice to use a pyrotechnic fuse to trigger an event, such as the interruption of an electrical current in an overheated circuit (U.S. Pat. No. 6,515,570), or else the opening of a pressurized gas bottle (U.S. Pat. No. 5,881,819).

Moreover, pyrotechnic devices are known for actuating an actuator or a syringe, or else for pressurizing a reservoir. These devices are especially applied in the automotive safety field (EP 1 486 697), the fire extinction field (EP 0 956 883; EP 1 609 507) and the medical field (FR 2 852 516). Within such devices, the ignition of a pyrotechnic charge is triggered by mechanical, electrical or radiative controls.

Various devices for injecting coolants, lubricants or other safeguarding fluids into systems subject to overheating have been developed. These devices operate:

either manually, for example within the context of the injection of cooling sprays for electronic circuits and for computers;

or with the intervention of reaction detectors (EP 1 376 720) or temperature and/or pressure sensors (FR 2 857 693). Such devices have relatively complex structures;

or autonomously. Devices for the autonomous injection of a safeguarding fluid are based on expansion properties of a fluid, such as mercury, which, upon expanding when heated, pushes a safeguarding fluid into a system subject to overheating (U.S. Pat. No. 1,570,873). In this kind of device, the response time between the moment when system overheating is detected and the moment when the safeguarding fluid is injected is unsatisfactory.

Finally, it is necessary to distinguish the devices of the invention (see below) from automatic maintenance and servicing lubricators applied in the mechanical field. Such lubricators operate on the principle of gas generation programmed by an electrochemical cell gradually pushing the piston of a syringe. They are designed to deliver continuous or periodic lubrication over a time of 1 to 12 months. Their delay in operating may be up to a week.

Within such a context, the invention provides a method for the autonomous injection of a fluid which is easy to implement and a device for the autonomous injection of a fluid suitable for implementing said method and of simple design. In particular, the present invention provides, within its broad aspect, a method for rapidly injecting a safeguarding, protective or conditional preventive-maintenance fluid into a system, in the event of overheating in said system, and the device associated with said method. The method and the device according to the invention have the advantage of being able to be used on an industrial scale, safely and reliably, in the manner of automotive safety airbag applications. Moreover, they benefit from the adjustment flexibility and know-how acquired in the space pyrotechnics field. Depending on the requirements, it is possible to adjust the injection time from a few milliseconds to several seconds.

The invention therefore relates, according to its first subject, to a method for the autonomous injection of a fluid, which comprises:

the thermal initiation and the combustion of at least one thermally initiatable gas-generating pyrotechnic charge;

the generation of combustion gases, said gases consisting of those resulting from said combustion of said at least one thermally initiatable gas-generating pyrotechnic charge or consisting of those resulting from said combustion of said at least one thermally initiatable gas-generating pyrotechnic charge and the combustion of at least one combustion-initiated pyrotechnic charge combustion-initiated by said at least one thermally initiatable pyrotechnic charge;

the pressurization of said fluid under the action of said combustion gases; and the delivery of said pressurized fluid.

This novel injection method is simple to implement. It is a pyrotechnic method that operates autonomously, without any connection to an energy source or a mechanical component external to the system to be protected within a system protection context (see later). In particular, it involves no external control of a mechanical, electrical or radiative nature. Characteristically, the thermal initiation is used within the context of the claimed method for injecting a fluid through the action of pyrotechnic gases generated during the normal operation of a pyrotechnic generator. Said fluid is therefore injected at a predetermined temperature, that which has triggered the combustion of the at least one thermally initiatable pyrotechnic charge in question.

The fluid to be injected may especially consist of a liquid, an emulsion, a gel, a grease or a paste, optionally filled with solid agents, such as powders. Said fluid may also consist of a mixture of several fluids of different nature, especially a mixture of at least two fluids chosen from those listed above.

A person skilled in the art is aware of the nature of the thermally initiatable pyrotechnic charges that can be used in such a method and the temperature ranges at which the thermal initiation can then take place. Thermally initiatable gas-generating pyrotechnic charges per se have in particular been described in the patent documents U.S. Pat. No. 6,221,187, U.S. Pat. No. 6,101,947, U.S. Pat. No. 5,959,242, U.S. Pat. No. 5,739,460, U.S. Pat. No. 5,866,842 and FR 2 870 234. Other thermally initiatable pyrotechnic charges, called "thermites", which do not generate gases but only heat, may be used to initiate the combustion of at least one pyrotechnic charge which is itself a gas generator. Such materials (thermite charges) have in particular been described in the patent document U.S. Pat. No. 5,035,756. The expression "thermally initiatable gas-generating pyrotechnic charge" is therefore understood within the present description and the appended claims to mean a thermally initiatable gas-generating pyrotechnic charge per se or a thermally initiatable thermite pyrotechnic charge combined with a gas-generating pyrotechnic charge.

Advantageously, the combustion of the thermally initiatable pyrotechnic charge is initiated at a predetermined temperature of between 80° C. and 270° C. Thus, the method of the invention can in particular meet low-temperature operating requirements compared with those encountered in fire situations.

Combustion gas generation results mainly from two possible implementation variants. According to a first variant, gas generation derives solely from the combustion of at least one thermally initiatable gas-generating pyrotechnic charge (thermally initiatable gas-generating pyrotechnic charge=such a gas-generating charge per se or the combination of a thermite charge and a gas-generating pyrotechnic charge). According to a second variant, it derives from the combustion of at least one thermally initiatable gas-generating pyrotechnic charge (thermally initiatable gas-generating pyrotechnic charge=such a gas-generating charge per se or the combination of a thermite charge and a gas-generating pyrotechnic charge) and from that of at least one combustion-initiated pyrotechnic charge combustion-initiated by said at least one thermally initiatable pyrotechnic charge. The second variant may involve at least one additional pyrotechnic charge placed between said at least one thermally initiatable pyrotechnic charge and said at least one combustion-initiated pyrotechnic charge. In this situation, the combustion of said at least one combustion-initiated pyrotechnic charge is initiated by said at least one thermally initiatable pyrotechnic charge via said at least one additional pyrotechnic charge, which then acts as an ignition relay.

The gases, generated following the combustion of all of the pyrotechnic charges present, pressurize the fluid to be injected until reaching a pressure such that their action enables the pressurized fluid to be delivered, generally after at least one sealing element (permitting the pressure rise) has been torn, which then provides the delivery means function. Said fluid is in fact generally delivered when at least one frangible membrane—a plastic or metal film—yields by tearing, advantageously without any fragments, under the pressurization force.

To control the injection (its triggering and its execution), several parameters may be optimized, especially:

the form taken by the pyrotechnic material(s) used. The thermally initiatable pyrotechnic charge (=gas-generating charge per se or thermite charge combined with a gas-generating pyrotechnic charge) and/or the additional pyrotechnic charge (if such is involved) and/or the combustion-initiated pyrotechnic charge (if such is involved) may be in powder and/or granule and/or particle and/or block form;

the composition of the pyrotechnic material(s) used, the composition of the thermally initiatable pyrotechnic charge being mainly chosen according to the desired initiation temperature. Said thermally initiatable pyrotechnic charge and/or the additional pyrotechnic charge (if such is involved) and/or the combustion-initiated pyrotechnic charge (if such is involved) generally correspond(s) to one or more compositions of risk class 1.1 or 1.3, in particular to one or more live-combustion pyrotechnic compositions. Preferred live-combustion pyrotechnic compositions are those that are used in the barrel weapon field or automotive safety field. However, any other type of pyrotechnic composition may be adopted. According to a preferred variant for implementing the method of the invention, said composition(s) of the thermally initiatable pyrotechnic charge and/or the additional pyrotechnic charge (if such is involved) and/or of the combustion-initiated charge (if such is involved) generate(s) no acid compounds. Advantageously, said composition(s) of said thermally initiatable pyrotechnic charge and/or of said additional pyrotechnic charge (if such is involved) and/or of said combustion-initiated pyrotechnic charge (if such is involved) are/is made up of:

45 to 55% by weight of guanidine nitrate;
40 to 50% by weight of basic copper nitrate; and
0 to 5% of additives; and the amount of charge(s) involved.

By managing these parameters, it is possible:
to set the thermal initiation temperature;
to control the amount of gases generated and the pressure (from a few bar to several hundred bar) of said gases before injection; and
to control the combustion time of the pyrotechnic charges present (from a few milliseconds to a few seconds) and the duration of fluid delivery.

According to an advantageous variant, the method of the invention is carried out within the context of safeguarding or protection or conditional preventive-maintenance of systems liable to be subject to overheating (for example because of a mechanical or electrical overload, a short circuit, excessive friction, a coolant leak, a lubricant leak or the runaway of a chemical or electrochemical reaction). The injected fluid is delivered at a predetermined temperature, i.e. when the combustion of at least one thermally initiatable pyrotechnic charge is initiated at said predetermined temperature. Said fluid, injected autonomously, is a safeguarding or emergency fluid (intended to prevent destruction of a system), a protective fluid (intended to keep a system operational) or a conditional preventive-maintenance fluid (within a context of operation at the specification limits) and it is delivered into the system subject to overheating. In fact, the overheating of said system results in the initiation or ignition of said at least one thermally initiatable pyrotechnic charge. The gases generated then enable the fluid to be pressurized and delivered. The coupling between said system and said thermally initiatable charge is only of thermal nature. To implement the ignition, said at least one thermally initiatable pyrotechnic charge is advantageously placed in at least one housing of suitable thermal conductivity (adapted to the desired ignition time), said at least one housing being in contact with said system subject to overheating or at least partially integrated into the latter. A person skilled in the art knows that the sensitivity of the system can be adjusted by varying not only the physical and chemical properties of the charge(s) present, but also the positioning of said housing and/or the thermal conductivity thereof. Preferably, said housing is made of a material having a high thermal conductivity, such as copper and/or aluminum.

In the variant of the method of the invention in which at least one combustion-initiated pyrotechnic charge is associated with said at least one thermally initiatable gas-generating pyrotechnic charge (=gas-generating per se or thermite associated with a gas-generating pyrotechnic charge), it is not excluded for said at least one combustion-initiated pyrotechnic charge to be combustion-initiated by an external control. Such an implementation of the method of the invention is not a priori the most common one, but it may prove to be opportune in particular circumstances, such as for example:

before the self-initiation temperature of the thermally initiatable pyrotechnic charge has been reached;
for a failure of the system requiring the fluid to be injected and not causing overheating;
for a maintenance operation after a period of aging of the system;
for end-of-life destruction of the injection device.

One such particular implementation therefore involves the combustion initiation of a combustion-initiated pyrotechnic charge by an external control, the thermal initiation and the combustion of at least one thermally initiatable gas-generating pyrotechnic charge then taking place immediately thereafter.

The method of the invention (with or without intervention of a combustion-initiated pyrotechnic charge) may especially be carried out for:

the injection of lubricants or protective additives or coolants into machines; or the injection of coolants or reaction inhibitors into reactors; or the injection of protective additives or coolants into electronic systems.

The machines involved in the invention are especially rotating machines, more particularly mechanical bearings.

With reference to the field of injecting lubricants into mechanical bearings, in particular emergency lubrication of gearbox bearings in motor vehicles, a few details are given below, which are in no way limiting. The standard temperature range for the operation of an automobile gearbox is between 30° C. and 150° C. However, under extreme operating conditions, this temperature range may extend from −50° C. to +170° C. for limited periods. In the case of a critical situation, such as an overload, an overspeed, an overtemperature, a cold start, a long time under extreme operating conditions or a brake in the oil feed, the emergency lubrication of an automobile gearbox may advantageously be actuated. At the present time, no method and/or system has been proposed to deal with these emergency situations. The present invention does enable emergency situations, corresponding to a low level of lubrication or defective lubrication of the bearing, to be dealt with. Specifically, these emergency situations entail an increase in temperature of the bearing, and this can spontaneously initiate the combustion of said at least one thermally initiatable pyrotechnic charge. Advantageously, said at least one thermally initiatable pyrotechnic charge is selected, within this context, to be self-initiated at temperatures between 170° C. and 210° C., these temperatures being above the operating temperature range of the gearbox. Advantageously, for devices having dimensions of 20 mm by 40 mm (see below), a few hundred milligrams to a few grams of pyrotechnic materials are sufficient to inject 5 to 20 g of lubricant into an overheated mechanical bearing.

Applications of lubricant injection into mechanical bearings may be extended to the railroad field, to the aeronautical, especially helicopter, field and to the field of industrial machines (rotating machines, machine tools, construction site machinery, etc.).

According to its second subject, the invention relates to a device for the autonomous injection of a fluid (suitable for implementing the method described above), which comprises:

at least one housing of suitable thermal conductivity, capable of accommodating at least one thermally initiatable combustion-gas-generating pyrotechnic charge (gas-generating charge per se or thermite charge+gas-generating charge) which neither includes, nor is connected to, ignition, especially mechanical, electrical or radiative ignition, controls; and a reservoir suitable for storing said unpressurized fluid, equipped with at least one means for delivering said pressurized fluid through the action, directly or via a movable separating member between said at least one housing and said reservoir, of said combustion gases.

The novelty of the pyrotechnic device lies in the absence of ignition controls. To ensure ignition, at least one thermally initiatable gas-generating pyrotechnic charge is therefore involved in at least one housing. The exact positioning of said at least one thermal conductivity housing and/or the nature of said at least one housing (greater or lower thermal conductivity of its constituent material) enable(s) the response time elapsing between the moment of detection of an abnormal overheating and the moment of injection of said fluid to be controlled. Advantageously, these parameters are to be optimized so as to prevent the premature injection of the fluid due to inadvertent temperature peaks. Said parameters and the total amount of pyrotechnic charge(s) may also influence the injection kinematics of said fluid.

According to one preferred embodiment of the device of the invention, the reservoir suitable for storing the fluid is made of a material having a lower thermal conductivity than said at least one housing accommodating said at least one thermally initiatable pyrotechnic charge. Thus the aim is to keep the fluid to be injected, (especially the safeguarding, protective or conditional preventive-maintenance fluid) intact (away from) any overheating that may arise from the overheating of the system "to be protected". In this regard, said reservoir is advantageously made of a light material, such as a plastic.

Said reservoir is provided with at least one delivery means (acting as sealing element). In general, it comprises at least one membrane made of a frangible plastic or metallic film. Advantageously, said at least one membrane tears without fragmenting, under the pressurization force.

According to one particular embodiment of the device of the invention, a movable separating member is placed between the housing and the reservoir. Such a movable member is strictly necessary only if the combustion gas/injection fluid mixture is problematic and/or the injection of the combustion gas/injection fluid mixture poses problems. Such a movable member may in particular consist of a sliding piston or a deformable diaphragm.

Advantageously, the structure of the device of the invention is suitable, or includes adapting means, for contacting with or for at least partially integrating into a system liable to be subject to overheating. This structure allows the device to intervene rapidly in the event of overheating, to optimize the response time of said device and to limit the duration of the pressure and temperature loading of a jacket of the system liable to be subject to overheating.

In addition, the structure of the device of the invention enables the system to be sealed and makes it resistant to the vibratory stresses by involving only thermal-type coupling between the device for the autonomous injection of a fluid and the system to be protected that is liable to be subject to overheating. Within the context of integrating the device into a system, said device may especially be immersed in a liquid medium; for example, if the device is immersed in a chemical reactor, said device may autonomously inject a heat-transfer fluid or a reaction inhibitor, when the chemical reactor is subject to overheating.

According to one embodiment, the device further includes a combustion chamber placed between, and communicating (directly or via the movable separating member) with, said at least one housing and said reservoir, suitable for the combustion within it of at least one combustion-gas-generating combustion-initiated pyrotechnic charge. Said combustion chamber may also contain an additional pyrotechnic charge promoting the ignition of said combustion-initiated pyrotechnic charge. When a movable (housing/reservoir) separating member is present, said member is of course placed between said combustion chamber and the reservoir.

In general, this combustion chamber neither includes, nor is connected to, ignition controls, especially mechanical, electrical or radiative controls, for igniting said at least one combustion-initiated pyrotechnic charge. It is the combustion gases emanating from said thermally initiatable gas-generating pyrotechnic charge that induce the ignition of said combustion-initiated pyrotechnic charge, optionally by means of the additional pyrotechnic charge. The combustion gases generated by said combustion-initiated pyrotechnic charge help to pressurize the fluid and to inject it.

However, it is not excluded, in one particular version, for the combustion chamber to include a means for controlling the ignition of said at least one combustion-initiated pyrotechnic charge. This ignition control may for example be used to inject the fluid in the context of an anomaly not causing overheating liable to initiate the thermally initiatable charge or to inject the fluid in a maintenance context (see the variant above of the corresponding method).

According to one particular embodiment, the structure of the device of the invention is that of a syringe. The reservoir of such a syringe advantageously has several orifices (for delivering the fluid).

According to its third subject, the invention relates to a system liable to be subject to overheating, with which at least one device of the invention as described above (a device for the autonomous injection of a fluid) is associated. Such a system may especially be a machine, of the rotating machine type, more particularly a mechanical bearing, or a reactor or an electronic system. Such a system may especially be associated with several independent devices (of the invention) enabling a plurality of injections to be carried out by thermal initiation at least two different overheating temperatures, in at least one place in said system liable to be subject to overheating.

According to an alternative embodiment, at least one device (the single device of the system or at least one of the devices of said system) is provided with a combustion chamber that includes a combustion-initiated pyrotechnic charge that can be initiated by an ignition control.

The invention will now be described, entirely without limitation, with reference to the appended figures, in its two—method and device—aspects:

Figure 4:
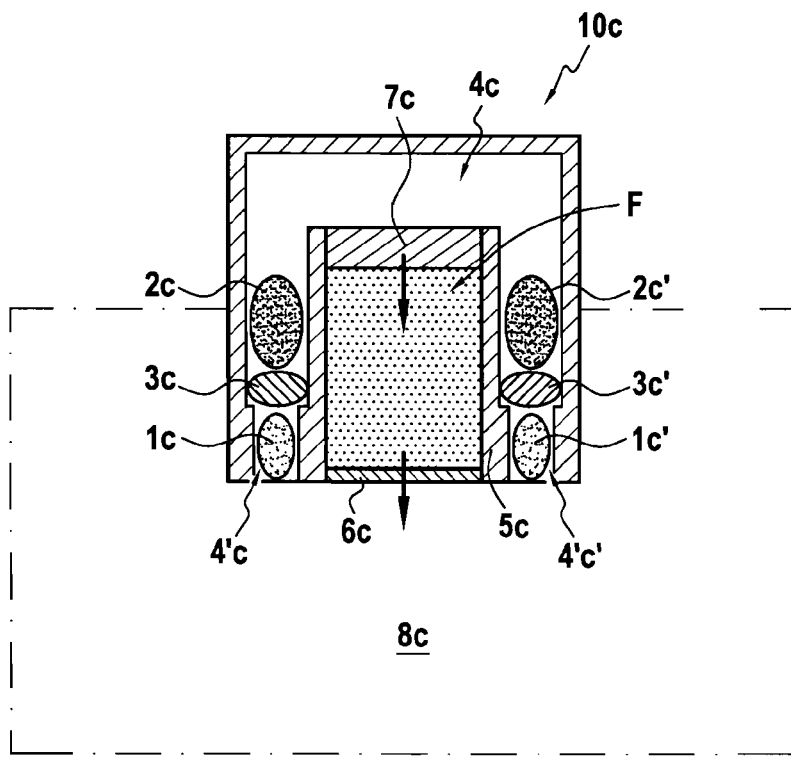
Figure 5:
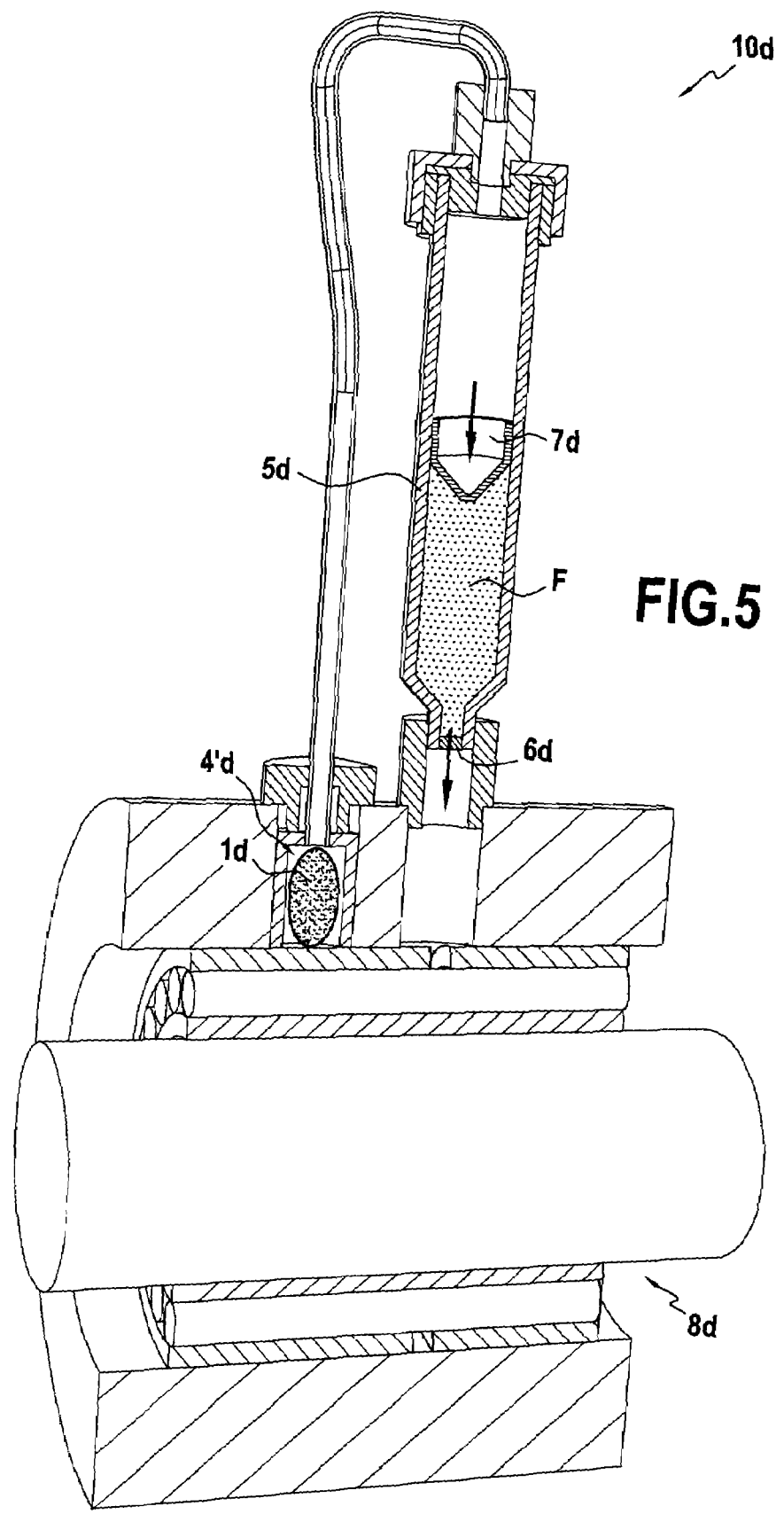

FIG. 4 shows a schematic longitudinal sectional view of a device of the invention for the autonomous injection of a fluid, according to a fourth embodiment, fitted onto a system liable to be subject to overheating; and FIG. 5 shows a longitudinal sectional perspective view of a device of the invention for the autonomous injection of a fluid, according to a fifth embodiment, fitted onto a mechanical bearing system.

FIGS. 1 to 5 therefore show several embodiments of devices for the autonomous injection of fluids according to the present invention.

Each of the devices 10; 10a; 10b; 10c; 10d shown comprises:
- at least one housing 4'; 4'a; 4'b; 4'c, 4'c'; 4'd of suitable thermal conductivity, capable of accommodating at least one thermally initiatable combustion-gas-generating pyrotechnic charge 1; 1a; 1b; 1c, 1c'; 1d, and neither includes, nor is connected to, ignition, especially mechanical, electrical or radiative ignition, controls;
- a reservoir 5; 5a; 5b; 5c; 5d suitable for storing an unpressurized fluid F, equipped with at least one means 6; 6a; 6b; 6c; 6d for delivering said pressurized fluid F; and
- a movable separating member 7; 7a; 7b; 7c; 7d between a combustion chamber 4; 4a; 4b; 4c (see below) or the housing 4'd and said reservoir 5; 5a; 5b; 5c; 5d, the displacement of which through the action of the combustion gases pressurizes said fluid F and delivers it.

Each of the devices 10; 10a; 10b; 10c; 10d is triggered by thermal initiation: the combustion of said at least one thermally initiatable gas-generating pyrotechnic charge 1; 1a; 1b; 1c, 1c'; 1d is initiated above a given temperature.

According to the embodiment shown in FIGS. 1 to 4, a combustion chamber 4; 4a; 4b; 4c is therefore placed communicatingly between said at least one housing 4'; 4'a; 4'b; 4'c, 4'c' and said movable member 7; 7a; 7b; 7c, suitable for the combustion within it of at least one combustion-initiated pyrotechnic charge 2; 2a; 2b; 2c, 2c'; said combustion of said at least one combustion-initiated pyrotechnic charge 2; 2a; 2b; 2c; 2c' generating combustion gases.

According to said embodiment, the chamber 4; 4a; 4b; 4c neither includes, nor is connected to, ignition controls, especially mechanical, electrical or radiative ignition controls, for igniting said at least one combustion-initiated pyrotechnic charge 2+3; 2a+3a; 2b+3b; 2c+3c, 2c'+3c' (the references 3; 3a; 3b; 3c, 3c' denote relay charges).

According to one embodiment (not shown), the combustion chamber includes a means for controlling the ignition of said at least one combustion-initiated pyrotechnic charge. In this case, the device may operate autonomously (by thermal initiation of the thermally initiatable gas-generating charge 1; 1a; 1b; 1c, 1c'), or may be triggered by means of an ignition control under the command, for example, of a sensor or a timer.

In FIGS. 1 to 4, the combustion of said at least one thermally initiatable gas-generating pyrotechnic charge 1; 1a; 1b; 1c, 1c' placed in the housing 4'; 4'a; 4'b; 4'c, 4'c' makes it possible to ignite, in the combustion chamber 4; 4a; 4b; 4c; 4d, at least one additional pyrotechnic charge 3; 3a; 3b; 3c, 3c' serving as ignition relay which, in turn, triggers the combustion of at least one combustion-initiated pyrotechnic charge 2; 2a; 2b; 2c, 2c'. In FIG. 5, only said thermally initiatable gas-generating pyrotechnic charge 1d is combusted in its housing 4'd. Said thermally initiatable pyrotechnic charge 1d is (assuredly) a thermally initiatable gas-generating pyrotechnic charge.

The thermal initiation and the combustion of said at least one thermally initiatable pyrotechnic charge 1; 1a; 1b; 1c, 1c'; 1d therefore generates combustion gases, said gases consisting only of those resulting from said combustion of said thermally initiatable pyrotechnic charge 1d or consisting of those resulting from said combustion of said at least one thermally initiatable pyrotechnic charge 1; 1a; 1b; 1c, 1c' and from the combustion of said at least one combustion-initiated pyrotechnic charge 2; 2a; 2b; 2c, 2c' combustion-initiated by said at least one thermally initiatable pyrotechnic charge 1; 1a; 1b; 1c, 1c' by means of said at least one additional pyrotechnic charge 3; 3a; 3b; 3c, 3c'.

The gases, generated by the combustion, exert pressure on the movable separating member 7; 7a; 7b; 7c; 7d and therefore pressurize the fluid F to be injected, said fluid being delivered when the delivery means 6; 6a; 6b; 6c; 6d yields, by tearing, advantageously without fragmenting, under the pressurization force. In FIGS. 1 to 5, the reservoir 5; 5a; 5b; 5c; 5d is that of a syringe, the movable member corresponds to a piston 7; 7a; 7b; 7c; 7d, and the delivery means is formed by a membrane 6; 6a; 6b; 6c; 6d and made of a plastic or metal film.

Referring to FIGS. 1 to 5, the housing 4'; 4'a; 4'b; 4'c, 4'c'; 4'd may especially have a high thermal conductivity, owing to the nature of the constituent material (for example copper or aluminum) of at least one of its walls and/or owing to the small thickness (for example a few tenths of a millimeter) of at least one of its walls.

The devices 10a; 10b; 10c; 10d shown in FIGS. 2 to 5 are fitted onto systems 8a; 8b; 8c; 8d liable to be subject to overheating, in particular onto a mechanical bearing system 8d (FIG. 5). These devices enable fluids, especially a safeguarding or protective or conditional preventive-maintenance fluid F, to be delivered or injected into said systems 8a; 8b; 8c; 8d and are especially suitable for the emergency lubrication of automobile gearbox bearings.

Each of said devices 10a; 10b; 10c; 10d for the autonomous injection of a fluid F has at least the housing(s) 4'a; 4'b; 4'c, 4'c'; 4'd of suitable thermal conductivity integrated into the system 8a; 8b; 8c; 8d liable to be subject to overheating. In addition, the reservoirs 5a; 5d of said devices 10a; 10d are in direct contact (FIGS. 2 and 5) with said systems 8a; 8d liable to be subject to overheating at the membranes 6a; 6d, whereas the reservoirs 5b; 5c are partly integrated (FIGS. 3 and 4) into said systems 8b; 8c.

Figure 1:
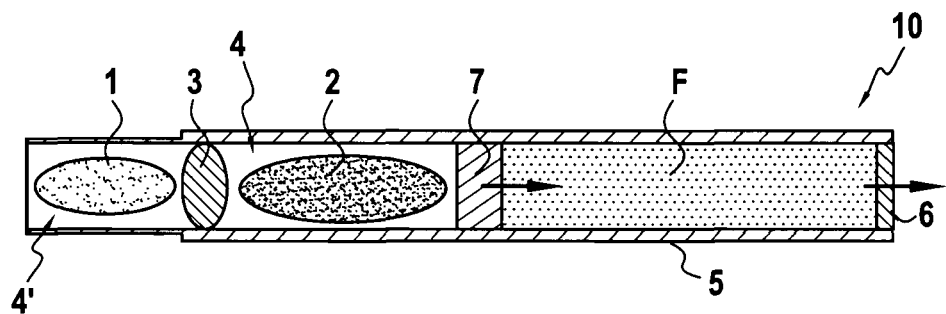
FIG. 1 shows a schematic longitudinal sectional view of a device for the autonomous injection of a fluid of the invention according to a first embodiment.
Figure 2:
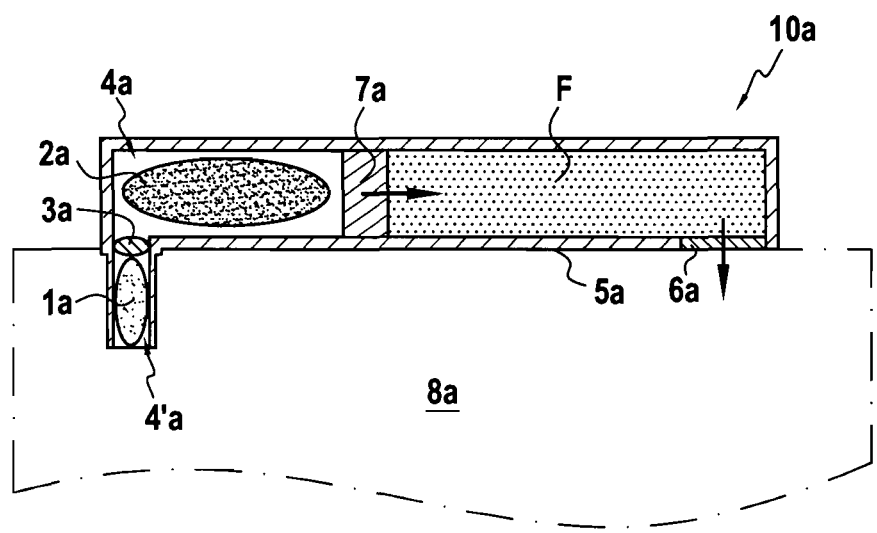
FIG. 2 shows a schematic longitudinal sectional view of a device for the autonomous injection of a fluid, according to a second embodiment, fitted onto a system liable to be subject to overheating.
Figure 3:
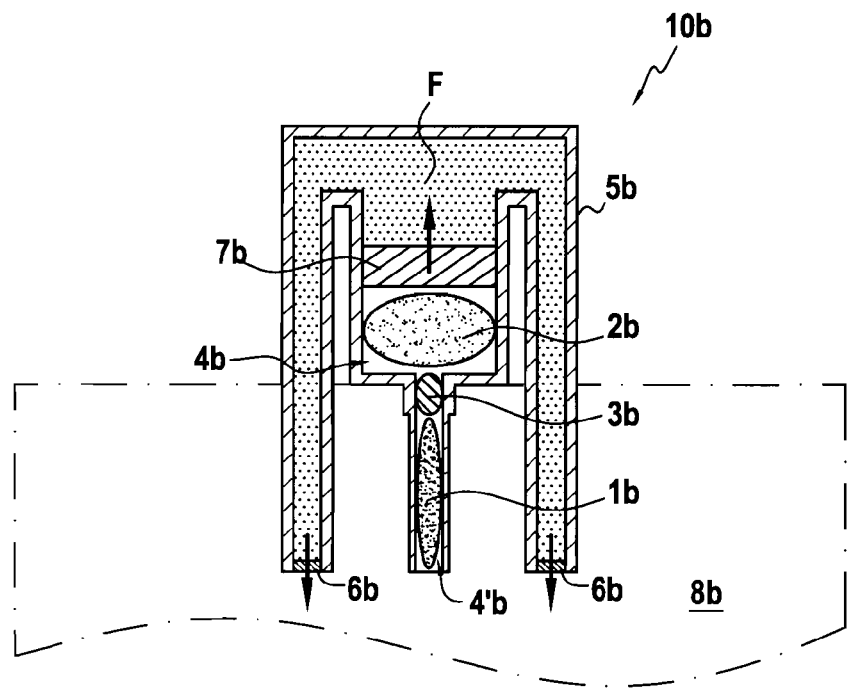
FIG. 3 shows a schematic longitudinal sectional view of a device of the invention for the autonomous injection of a fluid, according to a third embodiment, fitted onto a system liable to be subject to overheating.

Considering the appended figures, it may be seen that the combustion chamber contains a single combustion-initiated pyrotechnic charge (the embodiments shown in FIGS. 1, 2, 3 and 5) or two combustion-initiated pyrotechnic charges (the embodiment shown in FIG. 4) and that the gases generated can pressurize a fluid F and deliver it at a single place (the embodiments shown in FIGS. 1, 2, 4 and 5) or at two different places in the system liable to be subject to overheating (the embodiment shown in FIG. 3).

The invention will now be illustrated, entirely nonlimitingly, by the following example.

EXAMPLE

An example of the implementation of the method of the invention is given with reference to FIG. 5. The various parameters of said method are given in the following table.

| Device employed | FIG. 5 |
| --- | --- |
| Lubricant used | Bearing lubricants for automobiles, for steel making and for civil engineering equipment |
| Temperature range | $-30°$ C. to $+110°$ C.[1] |
| Viscosity | 105 cSt ($1.05 \times 10^{-4}$ m$^2$/s) |
| Injected lubricant volume | ~20 mL |
| Injected lubricant mass | ~20 g |
| Diameter of the injection orifice | 4 to 6 mm |
| Combustion chamber volume/lubricant volume | 2 |
| Amount of thermally initiatable pyrotechnic material | 180 mg |
| Spontaneous ignition temperature | 147° C. |
| Composition (in wt %) | 50% NTO[2], 40% GuDN[3], 10% GN[4] |
| Injection duration | ~0.3 s |
| Maximum injection pressure | 4.3 bar |
| Delay induced by the thermal conductivity of the housing (2 mm thick brass wall) | 4 s |

[1]$T_{max} = 110°$ C. < $T_{spontaneous\ ignition}$ of the lubricant, which is equal to or greater than 250° C., and $T_{max} = 110°$ C. < flashpoint, which is above 200° C.;
[2]NTO = 3-nitro-1,2,4-triazol-5-one,
[3]GuDN = guanylurea dinitramide;
[4]GN = guanidine nitrate.

The spontaneous ignition temperature of the thermally initiatable gas-generating pyrotechnic composition is reached in the brass housing four seconds later than in the bearing. This delay, which can be adjusted by the choice of material of the housing and by the arrangement of said housing, means that the self-initiation of the composition is not triggered when there is overheating at a discrete point in the bearing that is not characteristic of a malfunction.

The invention claimed is:

1. A method for the autonomous injection of a fluid, comprising:
    thermal initiation and combustion of at least one thermally initiatable gas-generating pyrotechnic charge;
    generation of combustion gases, said gases consisting of those resulting from said combustion of said at least one thermally initiatable gas-generating pyrotechnic charge or consisting of those resulting from said combustion of said at least one thermally initiatable gas-generating pyrotechnic charge and the combustion of at least one combustion-initiated pyrotechnic charge combustion-initiated by said at least one thermally initiatable pyrotechnic charge;
    pressurization of said fluid under action of said combustion gases; and
    delivery of said pressurized fluid;
    said fluid being a safeguarding, protective or conditional preventive-maintenance fluid delivered into a system subject to overheating; and
    said combustion of said at least one thermally initiatable pyrotechnic charge being carried out in at least one housing of suitable thermal conductivity, said at least one housing being in contact with and heated by said system subject to overheating or being at least partially integrated into said system.

2. The method as claimed in claim 1, wherein said combustion of said at least one thermally initiatable charge is initiated at a predetermined temperature of between 80° C. and 270° C.

3. The method as claimed in claim 1, wherein said combustion of said at least one combustion-initiated pyrotechnic charge is initiated by said at least one thermally initiatable pyrotechnic charge via at least one additional pyrotechnic charge.

4. The method as claimed in claim 1, including the initiation of at least one combustion-initiated pyrotechnic charge by an external control.

5. The method as claimed in claim 1, wherein said method is carried out for:
    the injection of lubricants or protective additives or coolants into machines; or
    the injection of coolants or reaction inhibitors into reactors; or
    the injection of protective additives or coolants into electronic systems.

6. An assembly comprising a system and at least one device in close association with the system, said system subject to overheating, said device for an autonomous injection of a fluid into said system, said device comprising:
    at least one housing of suitable thermal conductivity, capable of accommodating at least one thermally initiatable combustion-gas-generating pyrotechnic charge said pyrotechnic charge being spontaneously ignitable when said housing conducts heat to raise the temperature of said pyrotechnic charge to an ignition temperature;
    a reservoir suitable for storing unpressurized fluid, equipped to deliver pressurized fluid through the action, directly or via a movable separating member between said at least one housing and said reservoir, of said combustion gases; and said device being suitable for contacting with and heated by said system which is subject to overheating or being at least partially integrated into said system.

7. The assembly as claimed in claim 6, wherein said device includes a combustion chamber, placed between said at least one housing and said reservoir and communicating with said at least one housing and said reservoir, suitable for combustion within it of at least one combustion-initiated pyrotechnic charge; said combustion of said at least one combustion-initiated pyrotechnic charge generating combustion gases.

8. The assembly as claimed in claim 7, wherein said combustion chamber includes a means for controlling the ignition of said at least one combustion-initiated pyrotechnic charge.

9. The assembly as claimed in claim 6, wherein said device has structure in the form of a syringe.

10. The assembly as claimed in claim 8, including an additional device for an autonomous injection of a fluid into said system, said additional device comprising:

an additional housing of suitable thermal conductivity, capable of accommodating an additional at least one thermally initiatable combustion-gas-generating pyrotechnic charge, said additional pyrotechnic charge being spontaneously ignitable when said additional housing conducts heat to raise the temperature of said additional pyrotechnic charge to its ignition temperature; and an additional reservoir suitable for storing unpressurized fluid, equipped for delivering pressurized fluid through the action, directly or via a movable separating member between said additional housing and said additional reservoir, of said combustion gases, enabling at least two injections to be carried out with at least two different temperatures, in at least one place in said system subject to overheating.

11. The assembly as claimed in claim 6, wherein at least one device is provided with a combustion chamber that includes a combustion-initiated pyrotechnic charge that can be initiated by an ignition control.

* * * * *